(12) United States Patent
Ko et al.

(10) Patent No.: US 8,180,074 B2
(45) Date of Patent: May 15, 2012

(54) DISPLAY DEVICE AND SPEAKER SYSTEM FOR THE DISPLAY DEVICE

(75) Inventors: Young In Ko, Gyeongbuk (KR); Hee Jin Kim, Daegu (KR)

(73) Assignee: LG Electronics Inc., Seoul (KR)

( * ) Notice: Subject to any disclaimer, the term of this patent is extended or adjusted under 35 U.S.C. 154(b) by 1143 days.

(21) Appl. No.: 11/945,579

(22) Filed: Nov. 27, 2007

(65) Prior Publication Data

US 2009/0034174 A1    Feb. 5, 2009

(30) Foreign Application Priority Data

Jul. 30, 2007   (KR) .................. 10-2007-0076121

(51) Int. Cl.
    *H04R 25/00* (2006.01)
(52) U.S. Cl. ......... 381/152; 381/339; 381/386; 381/388
(58) Field of Classification Search ................. 381/152, 381/339, 386, 388
    See application file for complete search history.

(56) References Cited

U.S. PATENT DOCUMENTS

| | | | |
|---|---|---|---|
| 2004/0190742 A1 | 9/2004 | Sugiura et al. ............... 381/334 |
| 2004/0240687 A1 | 12/2004 | Graetz | |
| 2005/0129263 A1 | 6/2005 | Tamura et al. | |
| 2006/0008103 A1* | 1/2006 | Takahashi et al. ........... 381/333 |
| 2006/0280327 A1 | 12/2006 | Nakagawa | |
| 2006/0280329 A1 | 12/2006 | Soga | |
| 2008/0085019 A1* | 4/2008 | Wagenaars et al. ........... 381/152 |

FOREIGN PATENT DOCUMENTS

| | | |
|---|---|---|
| CN | 1163537 | 10/1997 |
| CN | 1647573 | 7/2005 |
| CN | 1799280 | 7/2006 |
| EP | 1 318 675 | 6/2003 |
| EP | 1 487 233 | 12/2004 |
| EP | 1 496 721 | 1/2005 |
| EP | 1 617 699 | 1/2006 |
| GB | 2 357 931 | 7/2001 |
| JP | 2001-189978 | 7/2001 |
| JP | 2005-197686 | 7/2005 |
| JP | 2005-197868 | 7/2005 |
| JP | 2006-074597 | 3/2006 |
| JP | 2008-167337 | 7/2008 |
| WO | WO 97/09852 A2 | 3/1997 |
| WO | WO 2006/038176 A1 | 4/2006 |
| WO | WO 2007/045908 A1 | 4/2007 |

OTHER PUBLICATIONS

International PCT Search Report dated Apr. 30, 2008.
European Search Report dated May 23, 2011 issued Application No. 07 83 4187.
Chinese Office Action dated May 19, 2011 issued in Application No. 200780100081.0 (with translation0).

(Continued)

*Primary Examiner* — Zandra Smith
*Assistant Examiner* — Paul Patton
(74) *Attorney, Agent, or Firm* — Ked & Associates LLP

(57) ABSTRACT

At least one exciter is used to produce sound for a flat panel display. The exciter vibrates the housing for production of sound. The housing may also include a plate mounted on the front surface of the housing and the exciter may be attached to the plate, which serves as a resonance plate.

16 Claims, 22 Drawing Sheets

OTHER PUBLICATIONS

European Search Report dated May 23, 2011 issued in Application No. 07 83 4185.
Chinese Office Action dated Jun. 9, 2011 issued in Application No. 200780053622.9 (with translation.

U.S. Office Action issued in U.S. Appl. No. 11/945,485 dated Jan. 3, 2012.

* cited by examiner

【Figure 1】
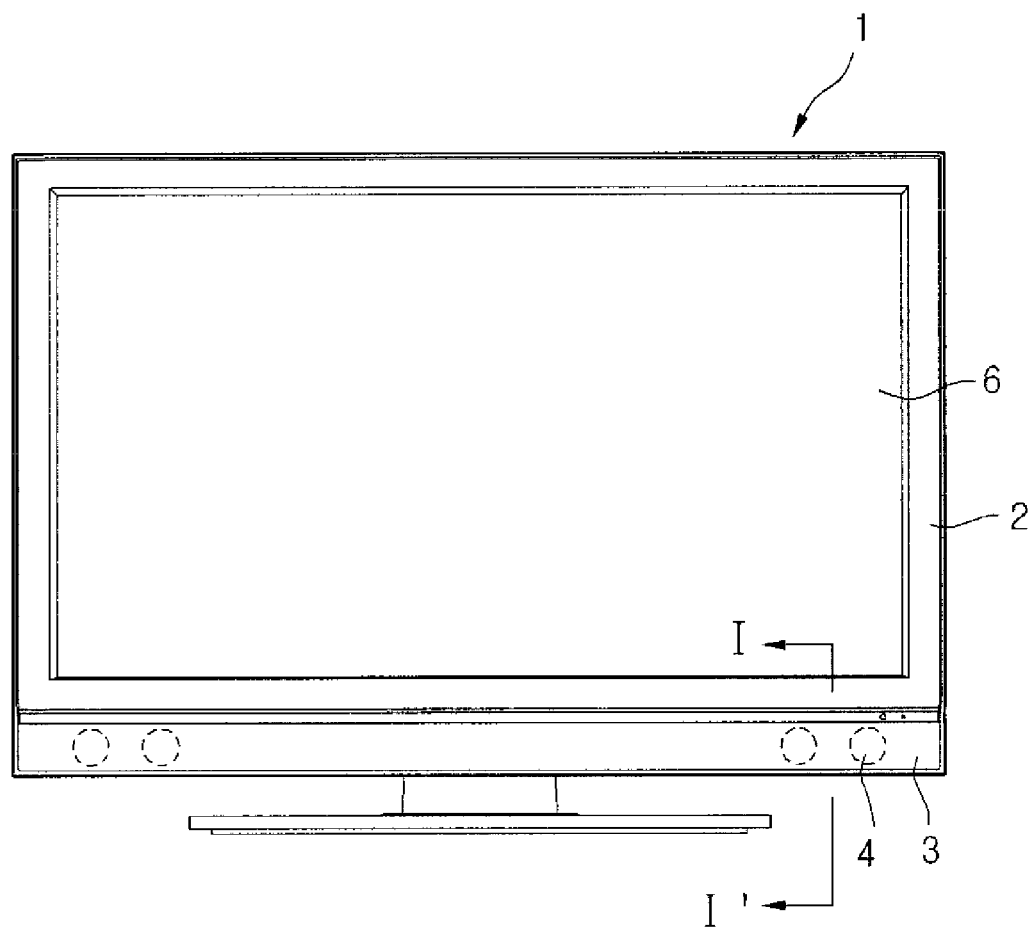

【Figure 2】
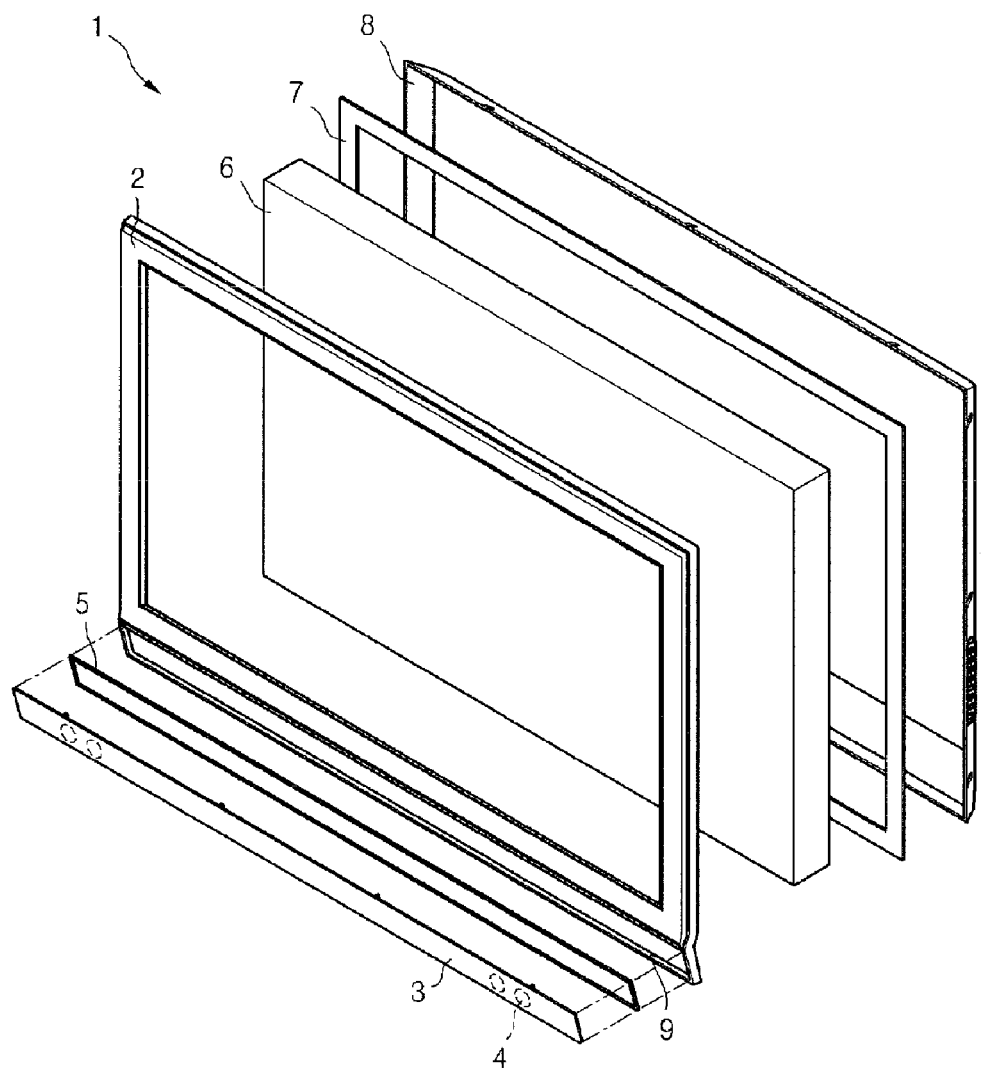

[Figure 3]
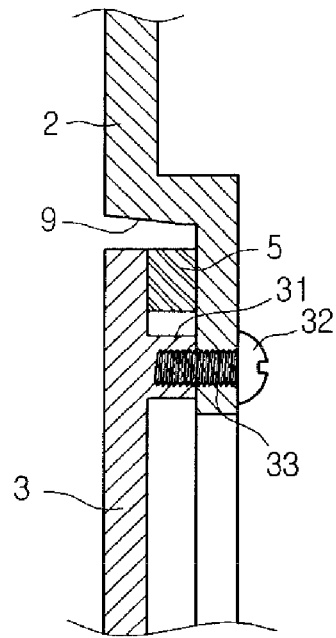
[Figure 4]
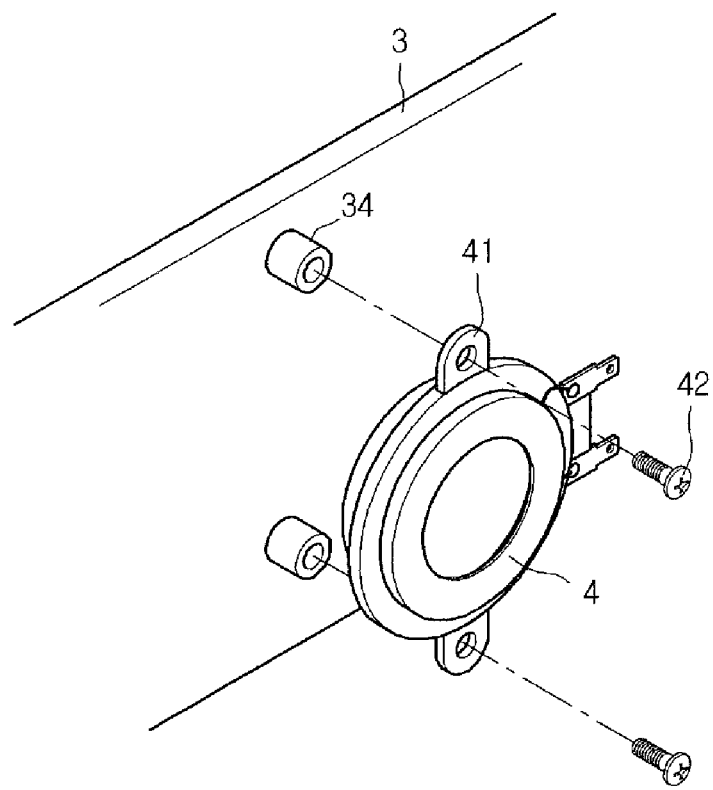

[Figure 5]
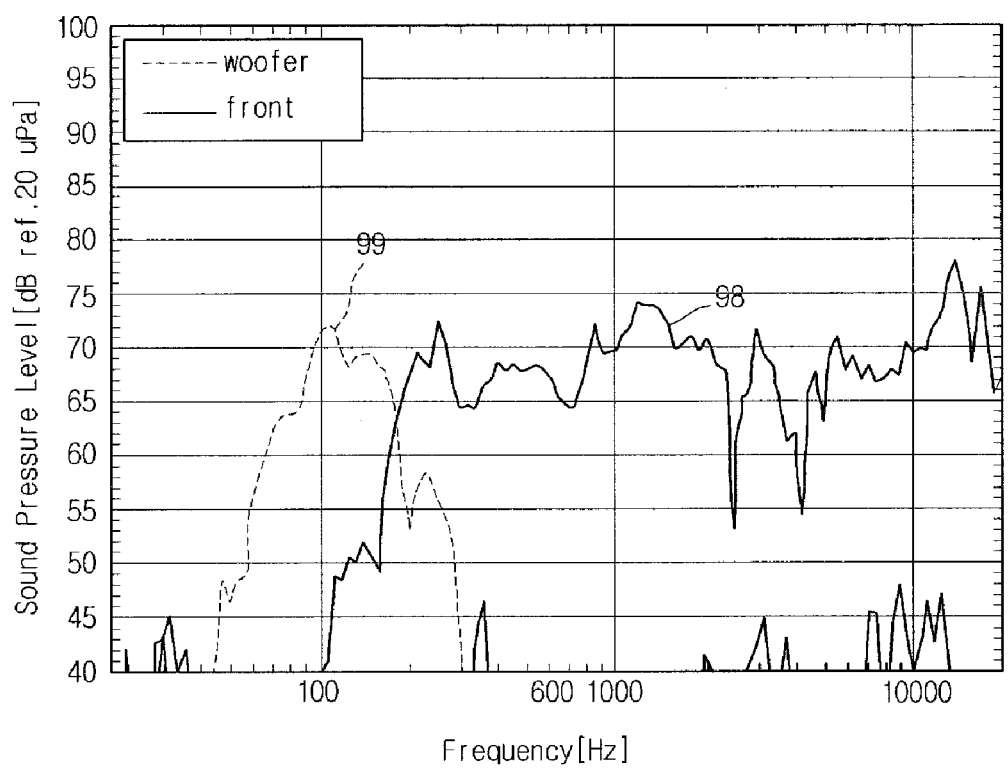

[Figure 6]
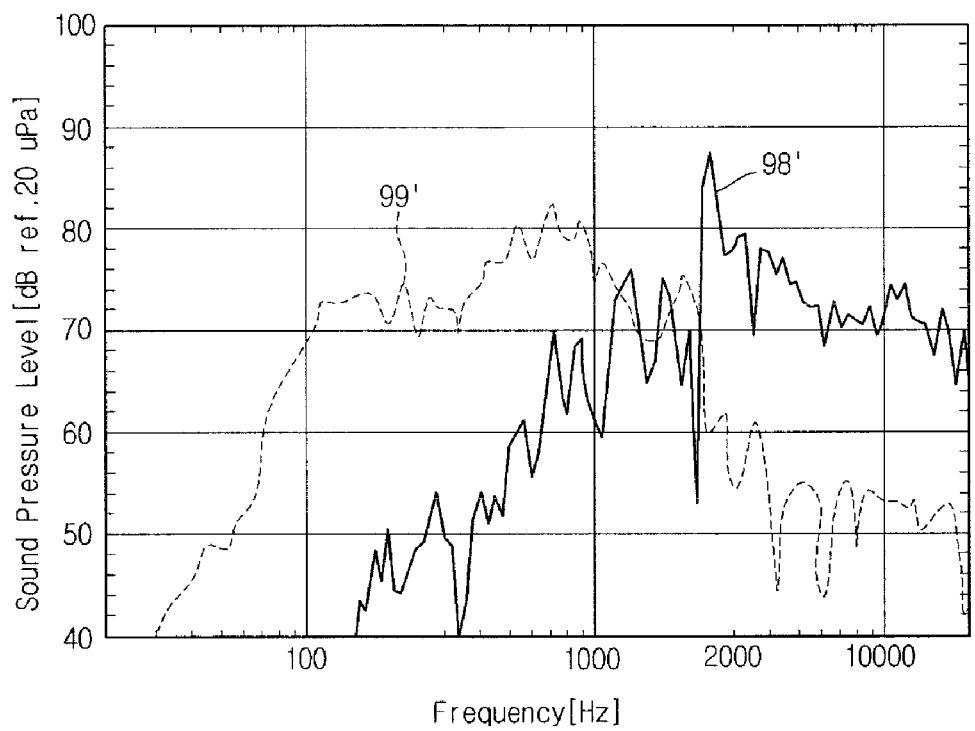

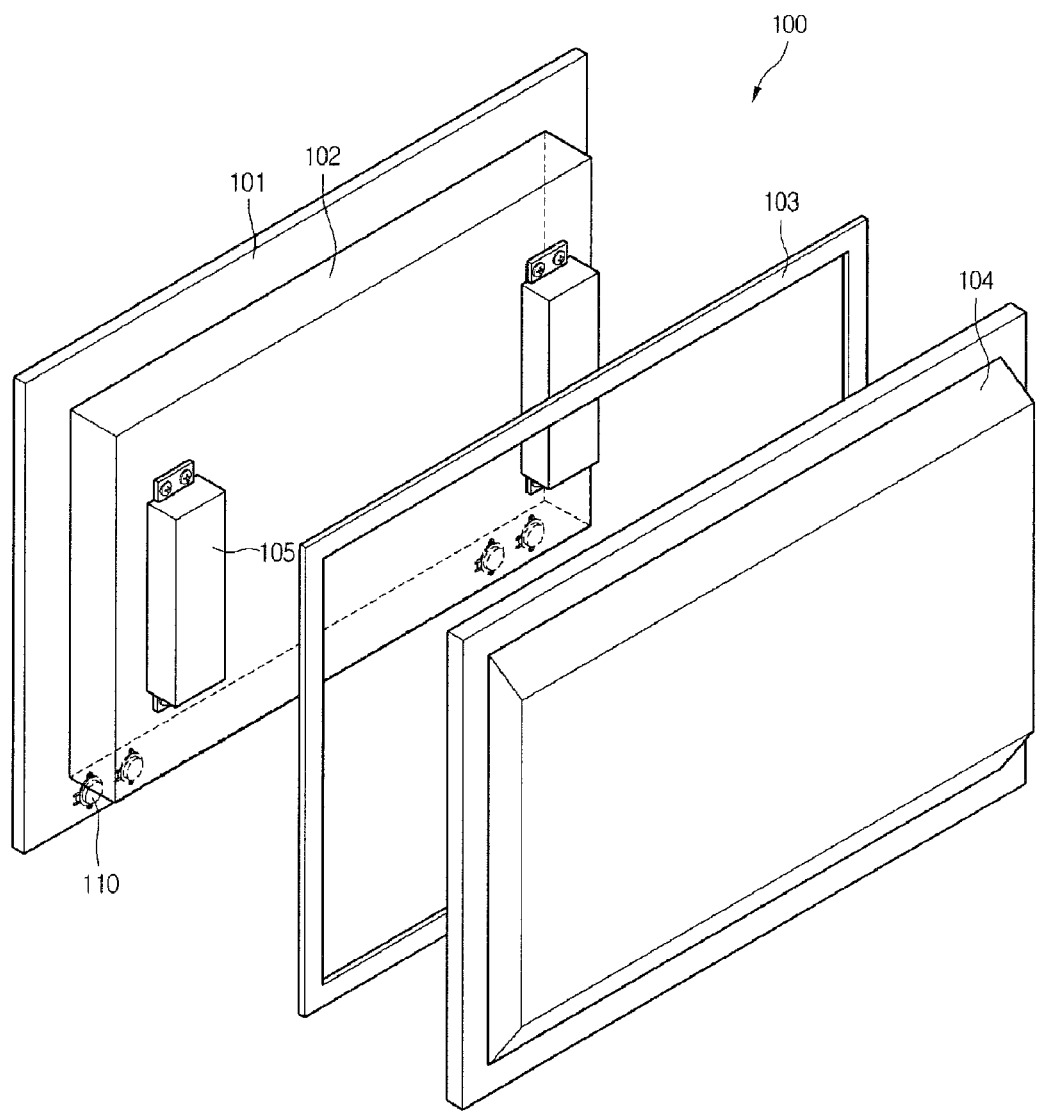
【Figure 7】

[Figure 8]
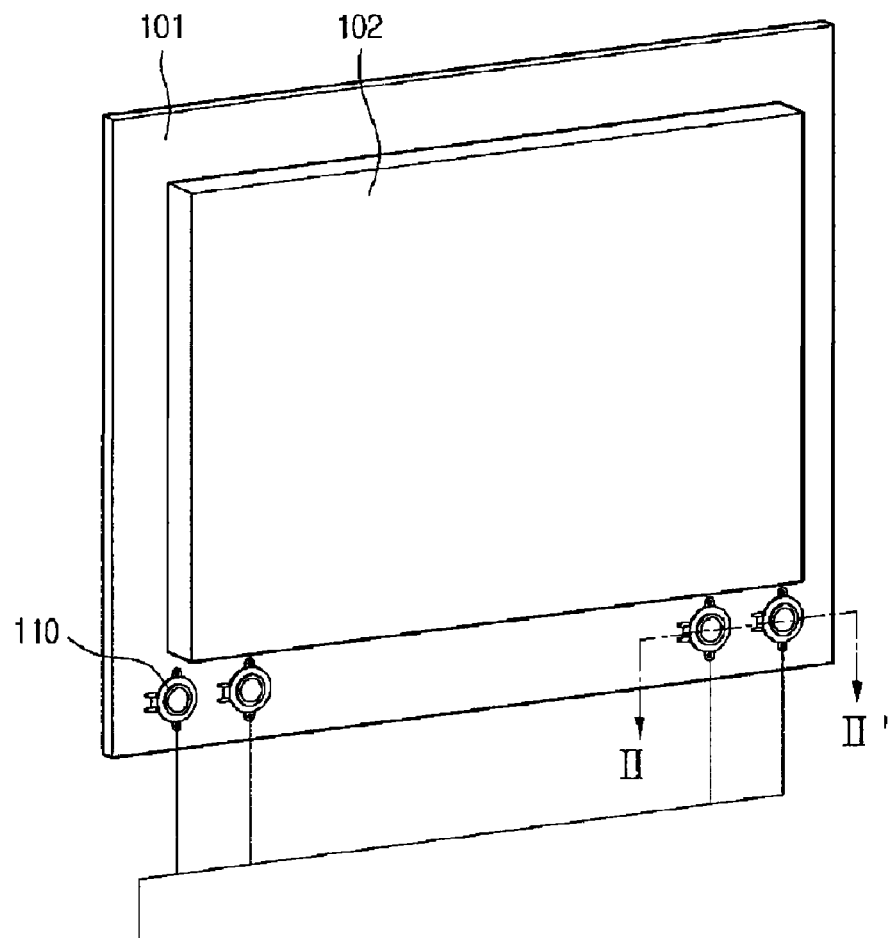
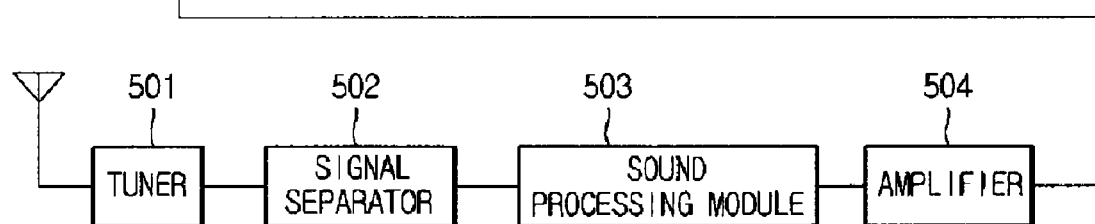

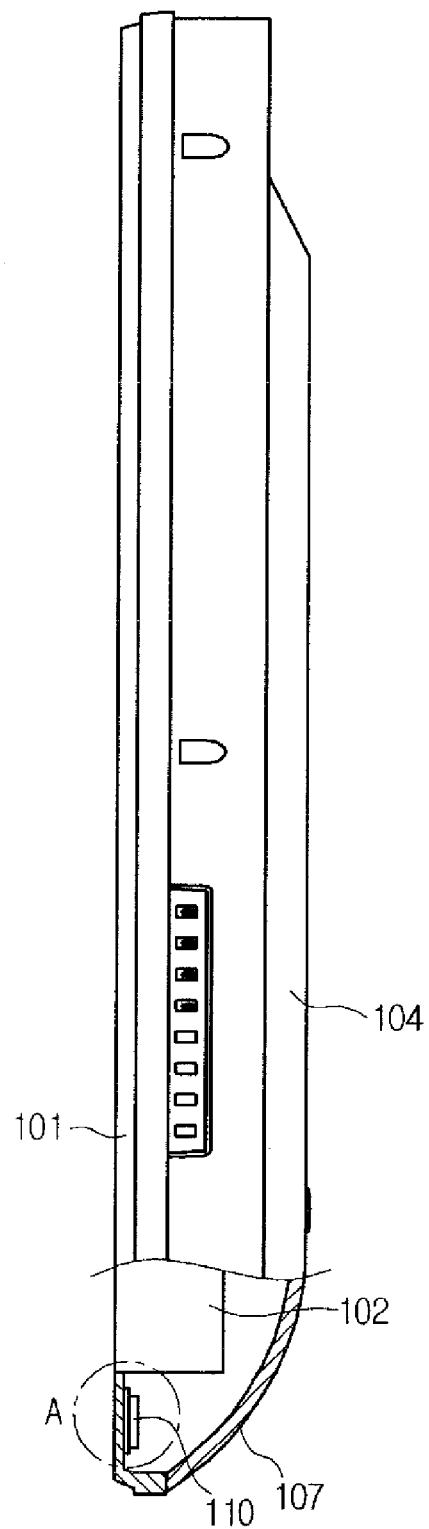
[Figure 9]

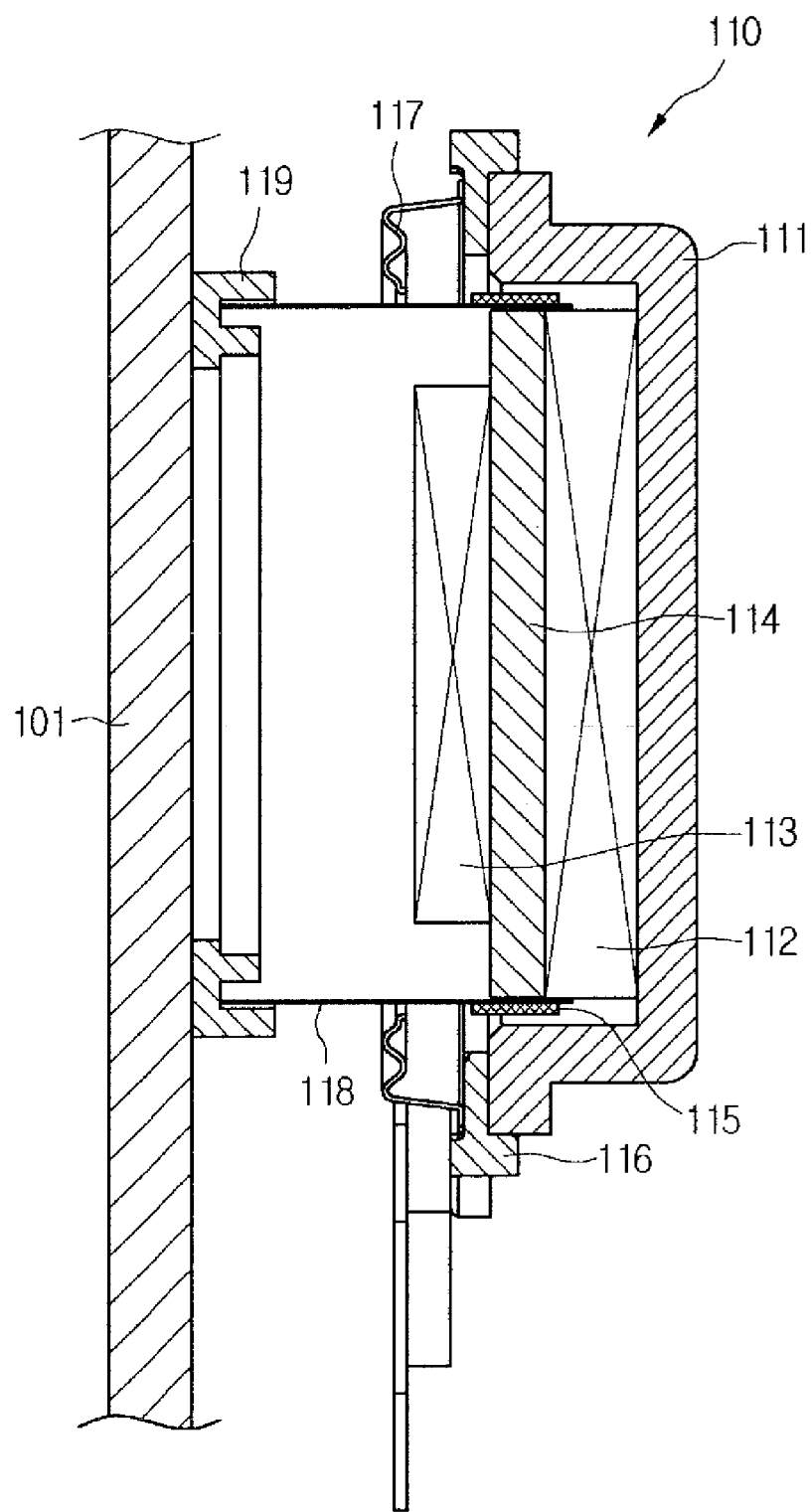
【Figure 10】

[Figure 11]
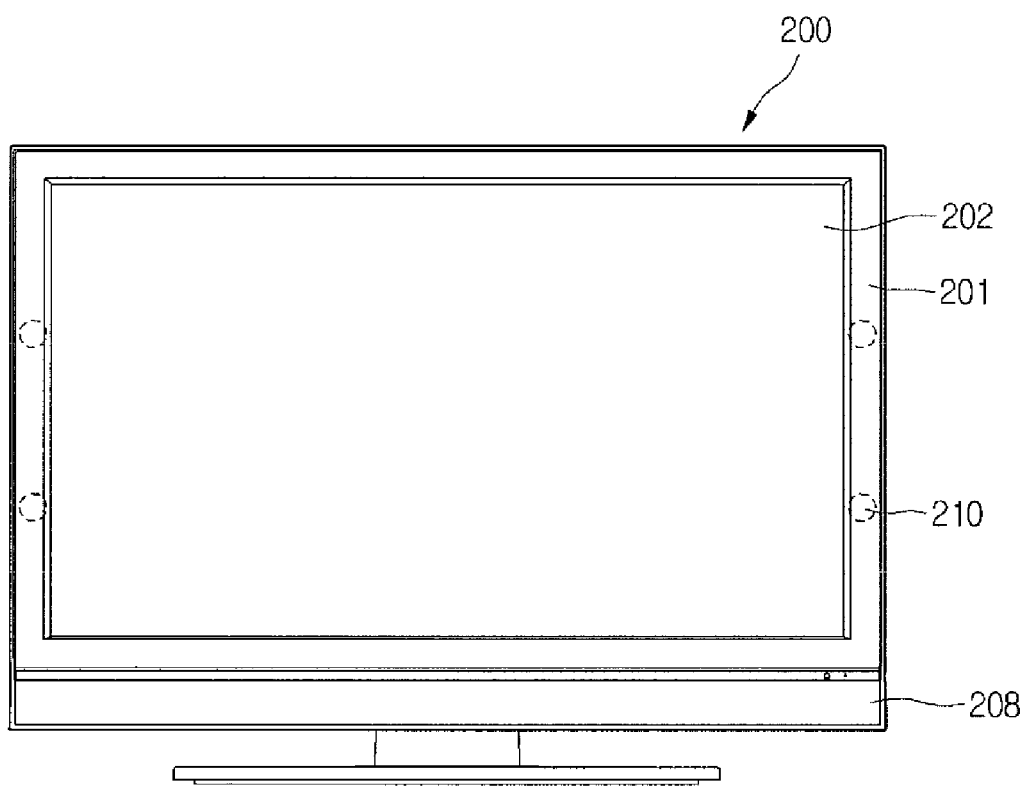

[Figure 12]
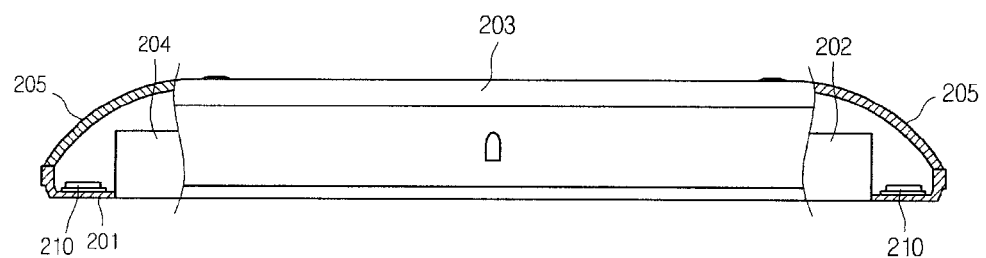

【Figure 13】
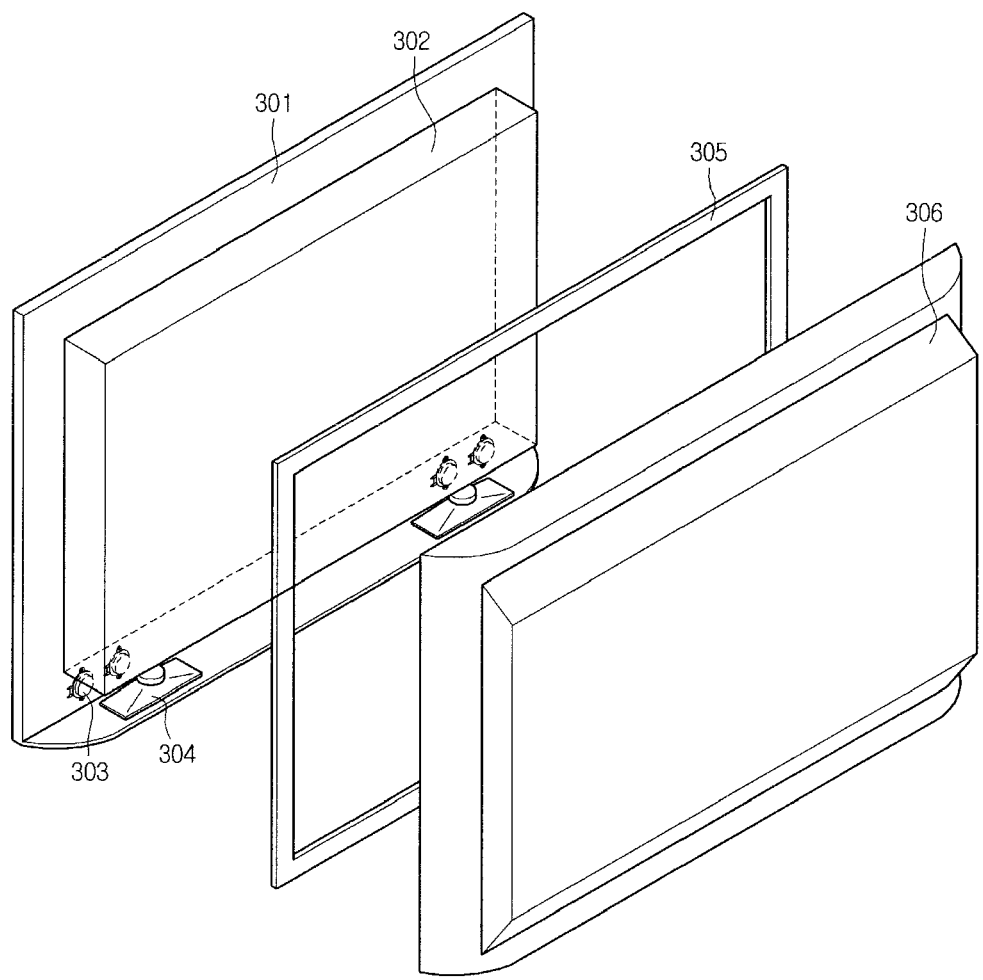

【Figure 14】
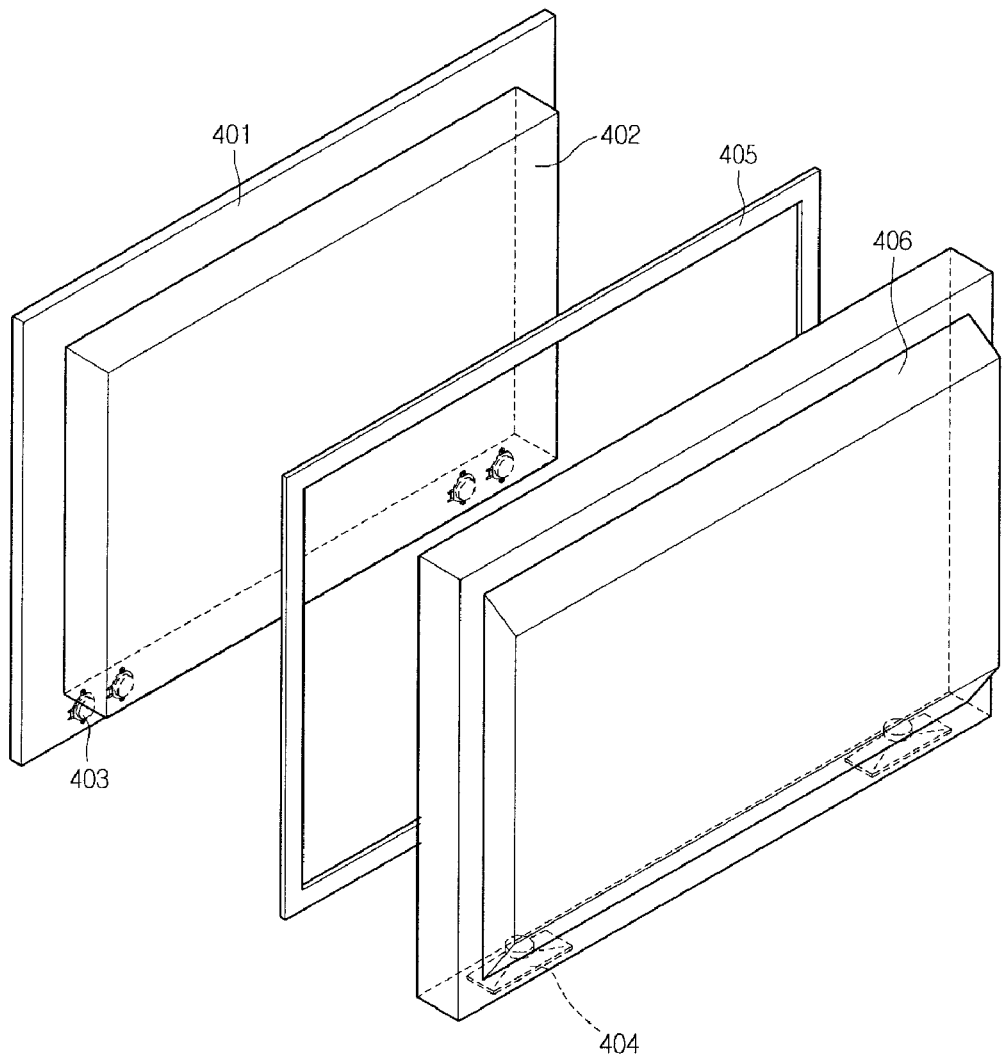

[Figure 15]
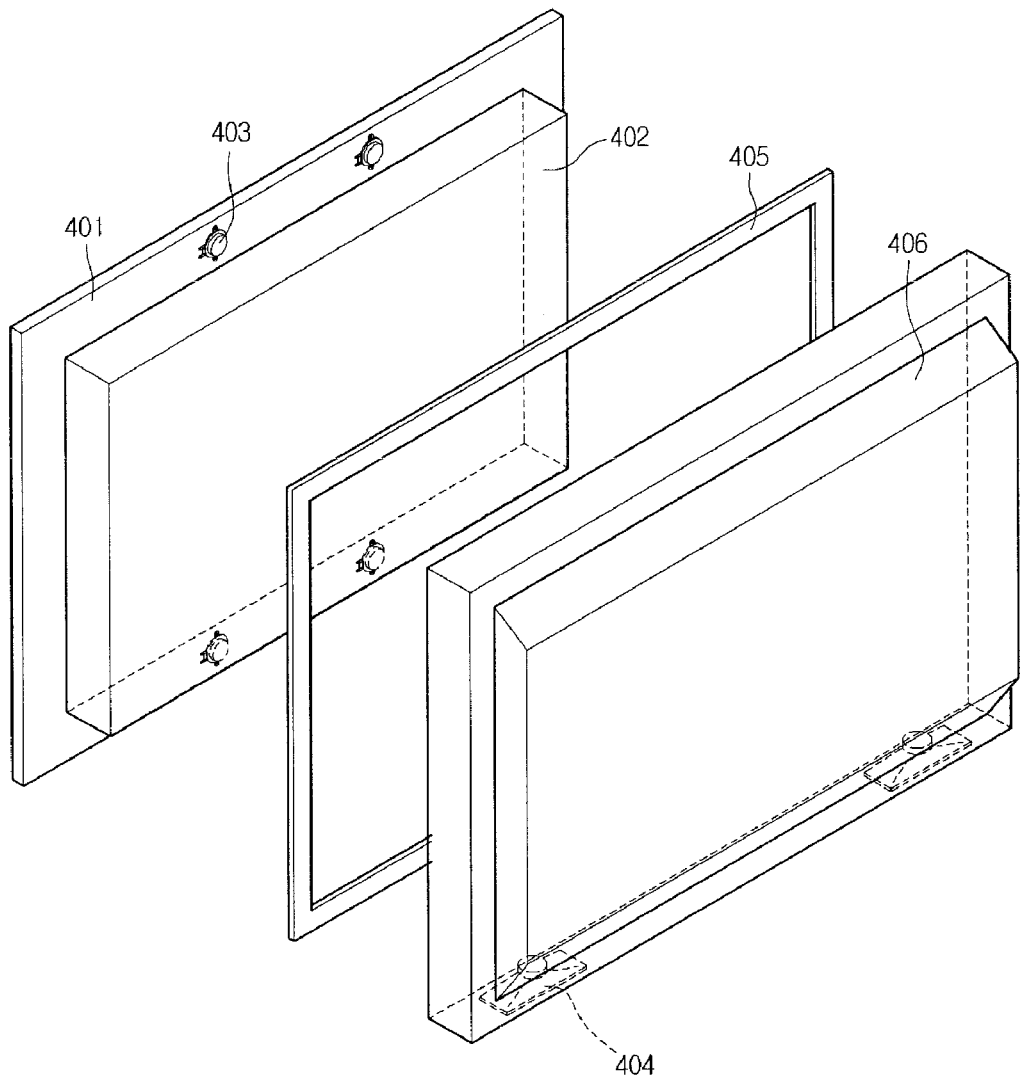

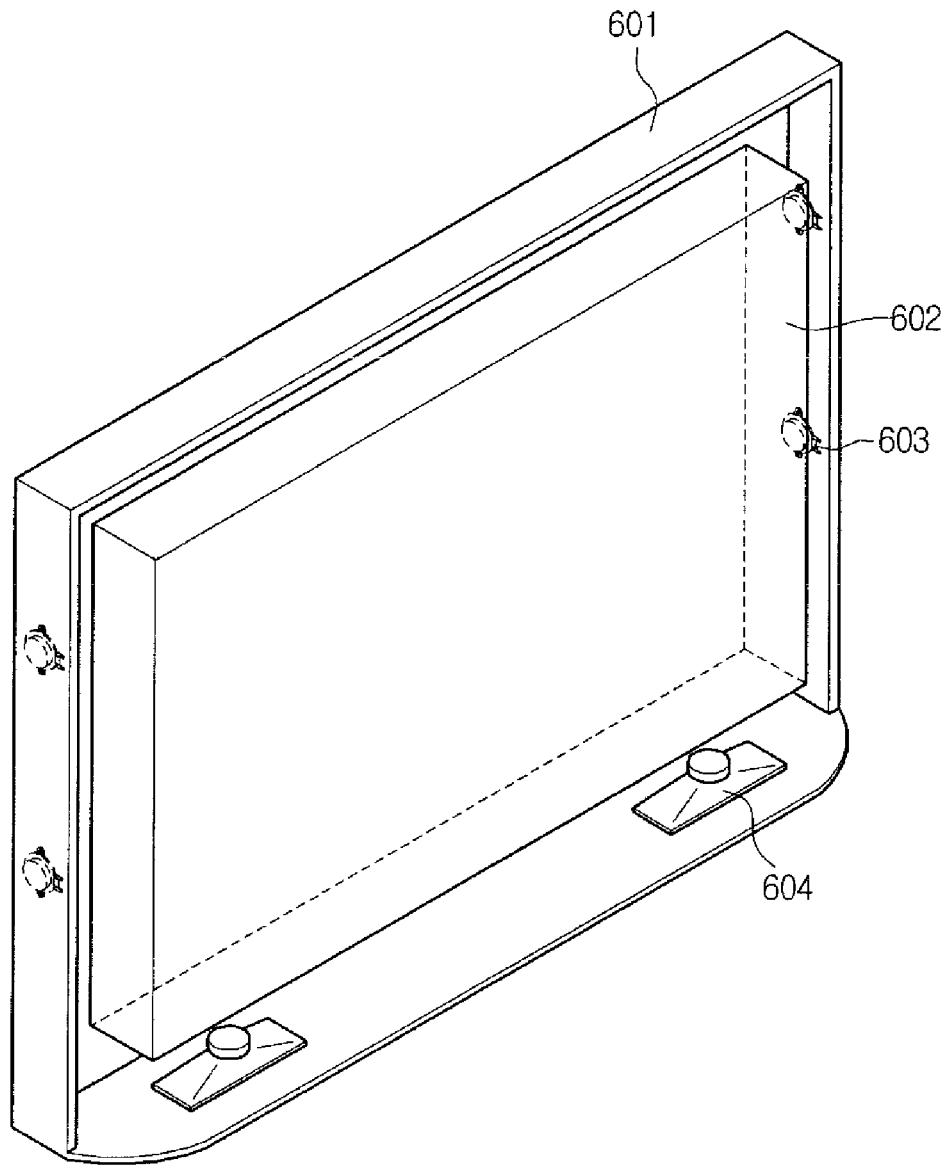
[Figure 16]

[Figure 17]
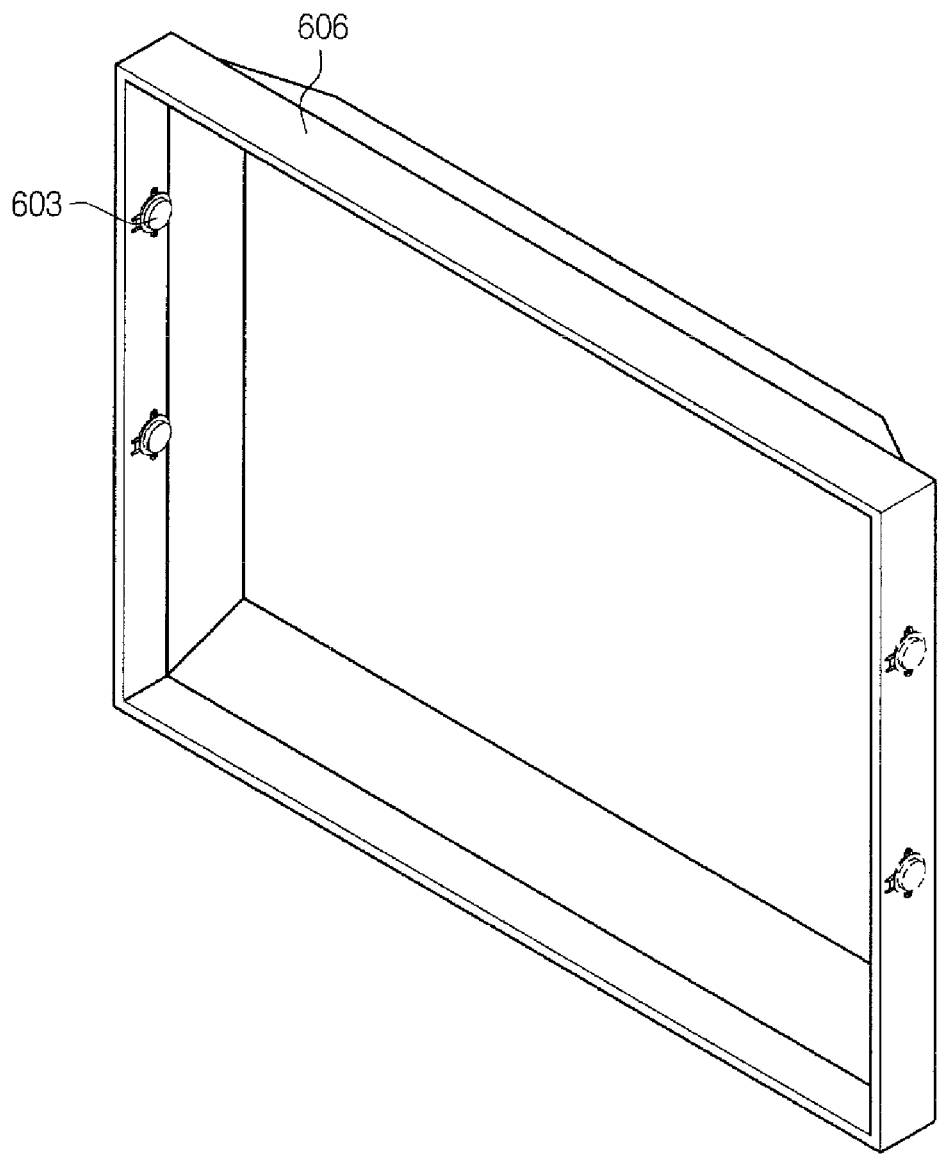

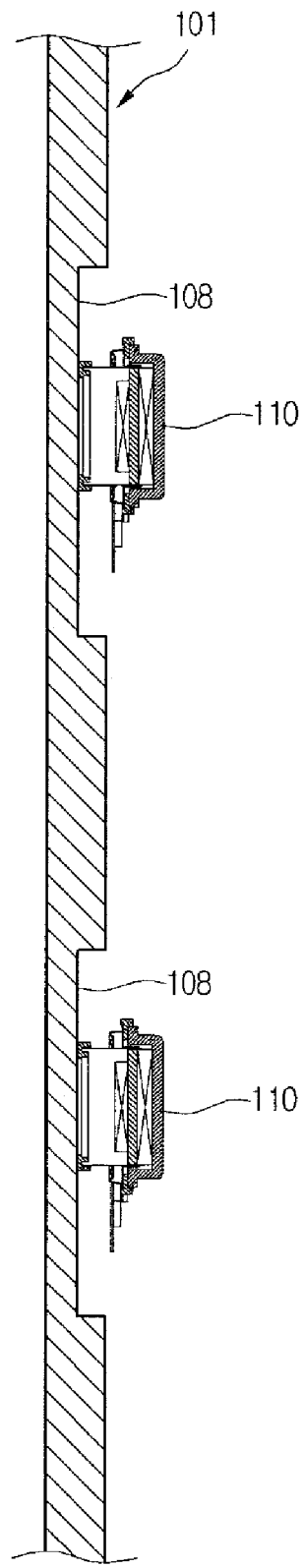
【Figure 18】

[Figure 19]
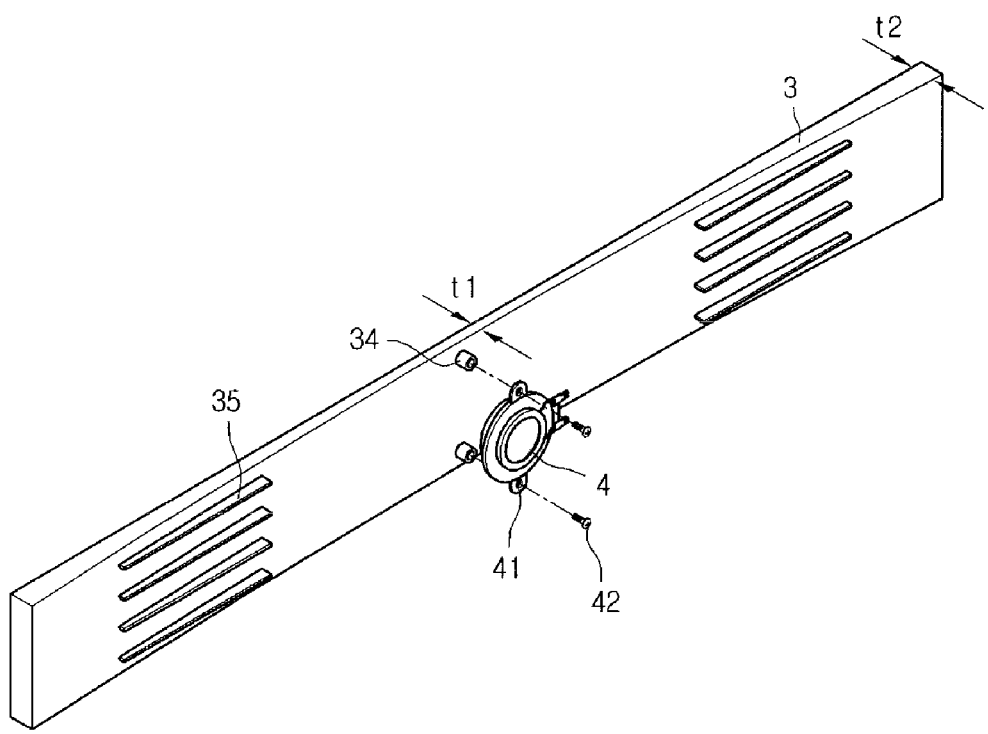

[Figure 20]
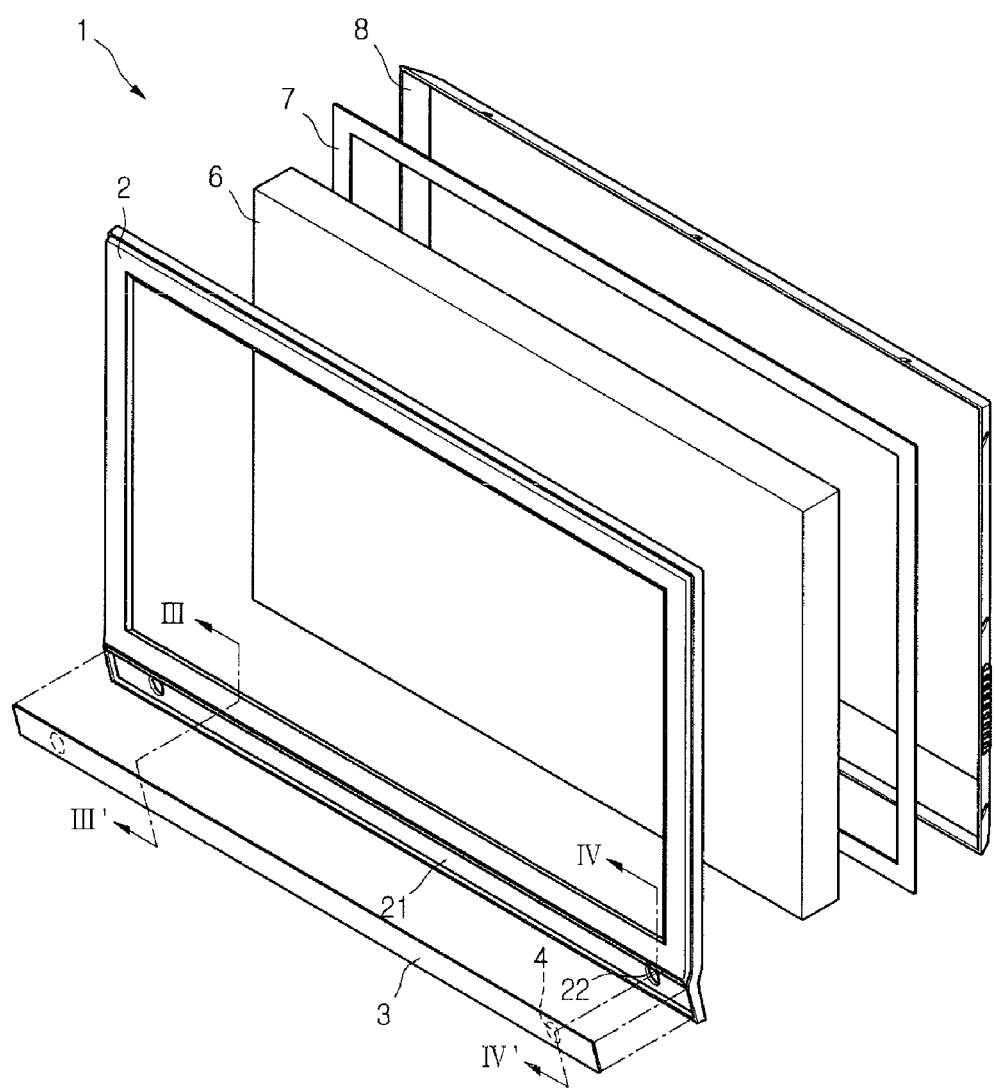

[Figure 21]
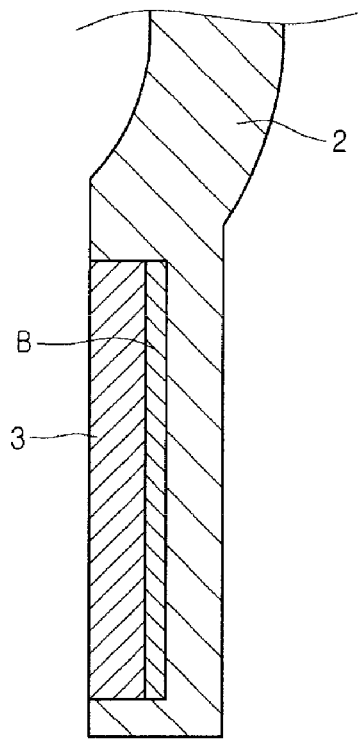
[Figure 22]
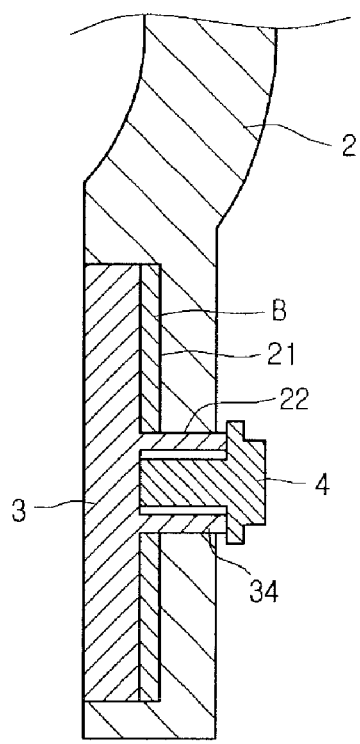

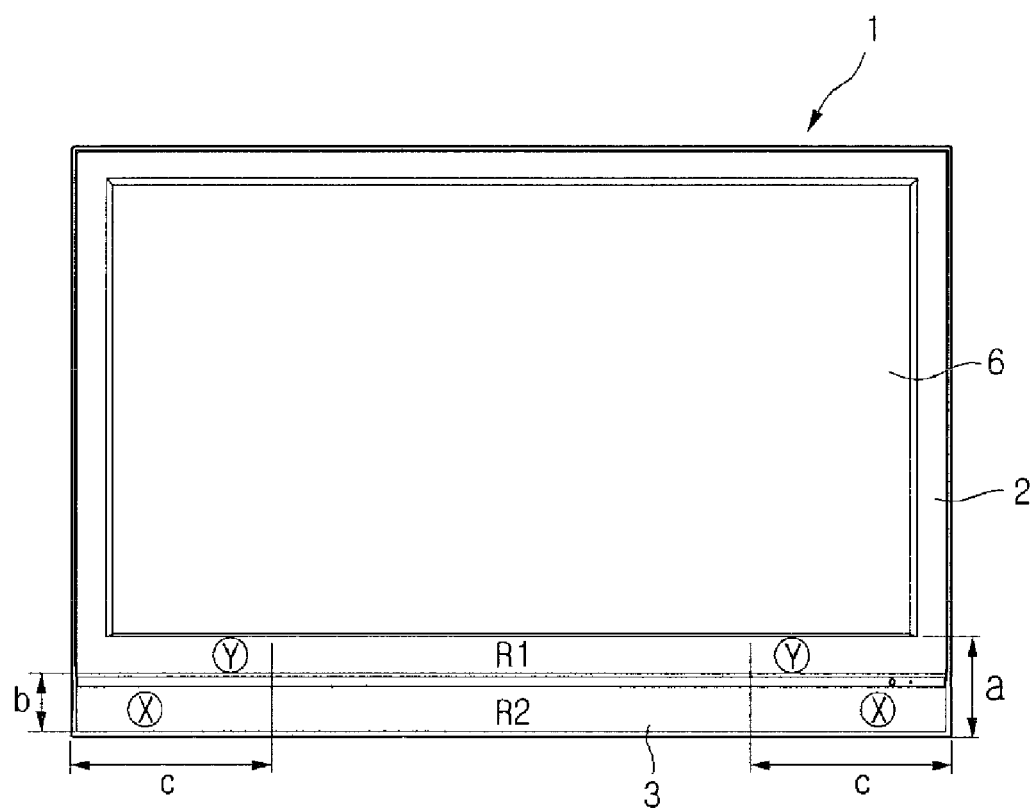
[Figure 23]

[Figure 24]
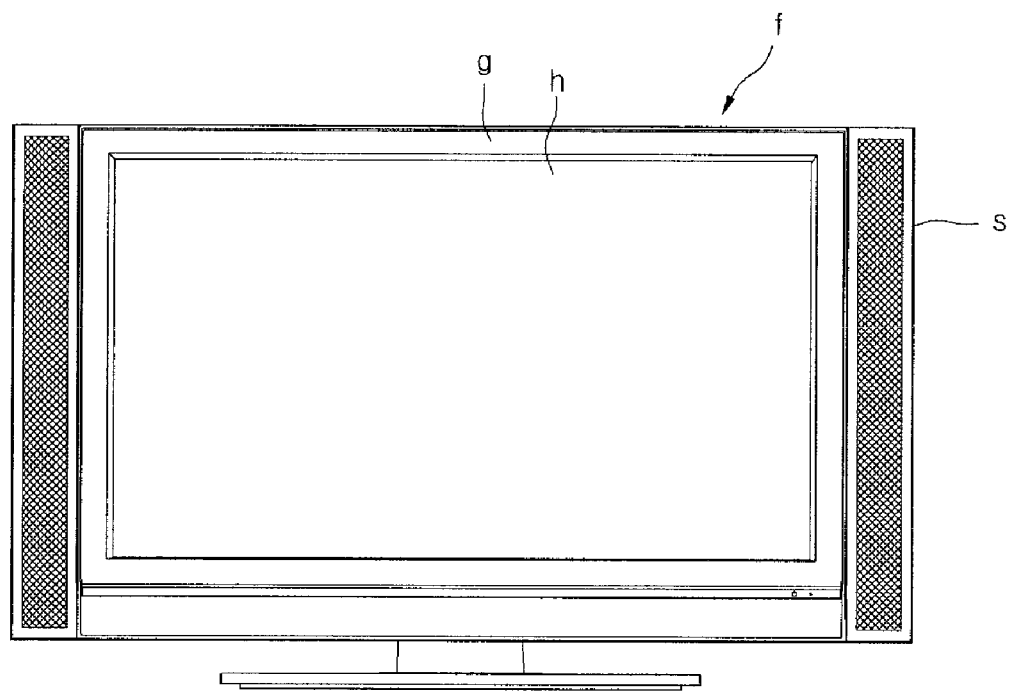

DISPLAY DEVICE AND SPEAKER SYSTEM FOR THE DISPLAY DEVICE

BACKGROUND

1. Field

The present disclosure relates to a display device having a speaker system.

2. Background

Generally, in the case of a television or similar display device, a speaker system is provided together with a screen. A speaker system may be attached to the display device. FIG. 24 shows a frontal view of a display device according to the related art. A display device (f) includes a display module (h), a front panel (g) enclosing the front perimeter of the display module, and a speaker (s) provided on either side of the front panel (g).

As shown, the speakers are visible which may not suit with a user's aesthetic taste. Further, a speaker or speakers attached (either integrated or attached separately) to a display module increases the overall size or dimensions of the display device. Further, when a non-integrated speaker is used, separate holes to attach the speaker may be needed for the display device, which may increase manufacturing cost.

BRIEF DESCRIPTION OF THE DRAWINGS

The embodiments will be described in detail with reference to the following drawings in which like reference numerals refer to like elements wherein:

FIG. 1 shows a frontal view of a display device according to an embodiment of the present disclosure.

FIG. 2 shows an exploded perspective view of a display device according to an embodiment of the present disclosure.

FIG. 3 shows a sectional view of FIG. 1 taken along line I-I'.

FIG. 4 shows an exploded perspective view of a structure for fixing an exciter on a resonating plate according to embodiments of the present disclosure.

FIG. 5 shows a graph showing frequency characteristic curves of sound reproduced when an exciter is mounted to a resonating plate through an adhering member.

FIG. 6 shows a graph showing frequency characteristic curves of sound reproduced when an exciter is mounted to a resonating plate through an adhering member and a boss.

FIG. 7 shows an exploded perspective view of a display device according to the second embodiment of the present disclosure.

FIG. 8 shows a schematic view of the configuration of a speaker system for a display device according to the second embodiment of the present disclosure.

FIG. 9 shows a side view of a display device according to the second embodiment of the present disclosure.

FIG. 10 shows an enlarged sectional view of section A in FIG. 10.

FIG. 11 shows a frontal view of a display device according to the third embodiment of the present disclosure.

FIG. 12 shows a plan view of a display device according to the third embodiment of the present disclosure.

FIG. 13 shows an exploded perspective view of a display device according to the fourth embodiment of the present disclosure.

FIG. 14 shows an exploded perspective view of a display device according to the fifth embodiment of the present disclosure.

FIG. 15 shows an exploded perspective view of a display device according to the sixth embodiment of the present disclosure.

FIG. 16 shows a rear perspective view showing a portion of a display device according to the seventh embodiment of the present disclosure.

FIG. 17 shows a perspective view of a back cover of a display device according to the eighth embodiment of the present disclosure.

FIG. 18 shows a sectional view of FIG. 8 taken along line II-II'.

FIG. 19 shows an exploded perspective view for describing when the exciter is fastened to the resonating plate.

FIG. 20 shows an exploded perspective view of a display device according to the eleventh embodiment of the present disclosure.

FIG. 21 shows a cutaway sectional view taken along line III-III' in FIG. 20.

FIG. 22 shows a cutaway sectional view taken along line IV-IV' in FIG. 20.

FIG. 23 shows a frontal view showing the installed positions of an exciter based on dimensions of a display device according to embodiments of the present disclosure.

FIG. 24 shows a frontal view of a display device according to the related art.

DETAILED DESCRIPTION OF PREFERRED EMBODIMENTS

Hereinafter, preferred embodiments of a display device and speaker system for a display device according to the present disclosure will be described in detail with reference to the accompanying drawings.

First Embodiment

FIG. 1 shows a frontal view of a display device according to an embodiment of the present disclosure. A display device 1 includes a front panel 2 that protects the front edges of a display module 6, a plate or a resonating plate 3 provided at the lower edge of the front panel 2, and a plurality of exciters 4 (also known as transducers) fixed to the rear surface of the resonating plate 3. The resonating plate 3 is a portion that directly forms the front panel of the display device. The resonating plate 3 itself becomes a portion of the front panel 2. Thus, a user may not be able to discern that the front panel 2 is functioning as a speaker.

To produce stereo sound, the exciter 4 is provided in duplicate at both the left and right sides of the display panel. The configuration shown in FIG. 1, however, is not definitive, and may be altered in various ways, of which various embodiments will be described below with reference to the diagrams. Although two exciters 4 are shown in each bottom sides, one on each side is possible or more than two on each side is also possible. Alternatively, a single exciter near or at the center may be sufficient.

A liquid crystal device (LCD) module, a plasma display device (PDP) module, or an organic light emitting diode (OLED) module may be used as the display module 6 provided on the display device 1.

In an LCD module, an electric field that is controlled in intensity is applied to liquid crystal material with anisotropic permittivity injected between two substrates, and the liquid crystal material controls the amount of transmitted light to obtain a desired image. An LCD module controls the size of the signal voltage relayed to liquid crystals through a data line by means of a gate voltage applied to a gate electrode.

Because this variable data voltage incrementally alters the polarized states of the liquid crystals, the LCD device is able to reproduce a wide range of gray levels.

The LCD module is a non-light-emitting device that requires light to display an image. Therefore, to obtain needed light, an LCD module employs a backlight unit disposed behind the LCD panel. Backlight units may generally be classified into two types—a line light source type utilizing a cold cathode fluorescent lamp (CCFL), and a surface light source type utilizing a flat-format fluorescent lamp.

A PDP module is a flat panel display device with high image quality that is both thin and lightweight, allowing its wide use in large-scale applications with a 40-inch or larger screen size. Pixels are formed at points of perpendicular intersection between partition walls and address electrodes formed on a rear panel and surface discharge electrodes formed on a front panel. A voltage is applied between sustain electrodes on the front panel and address electrodes on the rear panel, forming plasma in a space (discharge cell) formed between the partition walls. When a sustain voltage is applied between the sustain electrodes, a vacuum ultraviolet generated by the plasma excites a fluorescent material coated on the partition walls and lower surfaces between the partition walls, to generate red, green, and blue visible light.

An OLED that uses organic light emittance is typically configured with a positive pole, a negative pole, and an organic layer provided therebetween. It is common for the organic layer to be constituted as a multi-layer consisting of multiple layers formed of respectively different materials, in order to obtain optimum efficiency and reliability of the OLED. For example, the multi-layer may be formed of a hole injection layer, a hole transport layer, a light-emitting layer, an electron transport layer, an electron injection layer, etc. In this OLED configuration, when a voltage is applied between two electrodes, holes from the positive pole and electrons from the negative pole are injected in the organic layer. Excitons are formed when the injected holes and electrons meet, and light is emitted when the excitons return to a ground state. This OLED has the characteristics of self-luminescence, high brightness, low driving voltage requirements, wide viewing angle, high contrast, quick response, etc.

FIG. 2 shows an exploded perspective view of a display device according to an embodiment of the present disclosure. A display device 1 has a front panel 2 provided at the front around a display module 6, and a back cover 8 provided at the rear thereof. The front panel 2 may have a mounting portion 9 recessed and stepped rearward, and the resonating plate 3 may be mounted on the mounting portion 9. The rear surface of the resonating plate 3 has the exciters 4 (shown as dotted circle) fixed thereto.

A panel damping pad 5 may be interposed between the resonating plate 3 and the mounting portion 9. Sonic vibrations generated by the exciter 4 are transferred from the resonating plate 3 through the panel damping pad 5 to the front panel 2, so that noise that may be generated through friction between contacting portions of the resonating plate 3 and the front panel 2 can be absorbed when it exceeds a certain level. Sonic vibrations generated by the exciter 4 may be transferred from the resonating plate 3 to the front panel 2, so that the front panel 2 may also function as a resonating plate. The surface area of the resonating plate 3 can be enlarged to produce better bass response.

To prevent contacting noise occurring from between the front panel 2 and the back cover 8, when the front panel 2 is employed as a resonating plate, a cover damping pad 7 may be interposed between the back cover 8 and the front panel 2. While the vibration of the resonating plate 3 may be transferred to other structural components (especially the front panel) so that these other components perform the same function as the resonating plate 3, the damping pads 5 and 7 may prevent noise generated between the contacting surfaces of the structural components.

Higher quality sound reproduction can be derived compared to a separately provided plate. This effect may be attained through coupling the resonating plate and panel with screws. Furthermore, to prevent noise being generated by contact between the resonating plate and surfaces contacting it, an interposed damper pad may be used, thereby improving sound quality.

FIG. 3 shows a sectional view of FIG. 1 taken along line I-I'. The mounting portion 9 is recessed rearward, with the recessed surface having a screw hole 33 defined therein. A boss 31 protrudes from the rear surface of the resonating plate 3 corresponding to the position of the screw hole 33. A screw 32 is passes through the screw hole 33 and inserted in the boss 31, to fasten the resonating plate 3 to the mounting portion 9. The resonating plate 3 and the front panel 2 are thereby coupled by a screw.

The panel damping pad 5 may be optionally provided between the resonating plate 3 and the front panel 2. The panel damping pad 5 may prevent noise caused by frictional movement between the resonating plate 3 and the front panel 2. The mounting surface 9 is recessed rearward, and the height of the resonating plate 3 is about the same as the height of the front panel 2. A user may not be able to discern that the resonating plate 3 as a separate piece, provided at the lower portion of the front panel 2.

FIG. 4 shows an exploded perspective view of a structure for coupling an exciter on a resonating plate according to an embodiment of the present disclosure. An exciter 4 is coupled to the resonating plate 3. The exciter 4 is fixed firmly to the back of the resonating plate 3 through screws. Further, a double sided tape or glue may be used between the front surface of the exciter and the rear surface of the resonating plate 3. The boss 34 protrudes rearward from the resonating plate 3, and a tab 41 protrudes from the exciter 4 to couple with the boss 34. The screw 42 is inserted in the tab 41 and the boss 34 that are aligned with each other.

The coupling presses the vibration generating portion of the exciter 4 directly against the rear surface of the resonating plate 3, so that the vibration generated by the exciter 4 may be completely transferred to the resonating plate 3. Additionally, contacting noise between the exciter 4 and the resonating plate 3 may be prevented. Other types of fasteners may be used other than screws, e.g., rivets, bolt and nut, and any other type of fasteners capable of strong coupling.

In order to seal sonic vibrations transferred from the exciter 4, the boss 34 may be installed in a direction other than the direction of the resonating plate 3 movement. The boss 34 may be provided at the upper end and lower end of the resonating plate 3 to be perpendicular to the longitudinal direction of the resonating plate 3. In this way, no restriction may be imposed on the amount that the resonating plate 3 can vibrate or move.

While the exciter 4 may be capable of sufficiently reproducing mid to high range frequencies (from the frequency range of 20-20,000 Hz), the exciter 4 may not satisfactorily reproduce lower audible frequencies ranges. A woofer may be incorporated in a display device, to produce lower frequency ranges. One of the considerations for installing a woofer in a display device is to determine at what point the bass frequencies reproduced by the woofer will overlap with the midrange and treble frequencies reproduced by the exciter.

FIG. 5 shows a graph showing frequency characteristic curves of sound reproduced when an exciter is mounted to a resonating plate through an adhering member. Line 98 represents audio frequency characteristics reproduced by the front panel fixed to the exciter, and line 99 represents audio frequency characteristics reproduced by a woofer.

Referring to the represented lines 98 and 99, crossover normally occurs in the range of 100-600 Hz in this embodiment. When the exciter 4 is mounted to the rear surface of the resonating plate 3 using only an adhering member, e.g., the exciter is taped or glued to the plate, the cross over point seems to be approximately 150 Hz. Because sound reproduced by the exciter suddenly diminishes between 100-600 Hz when the front panel is used as the resonating plate, a separate woofer may be needed to increase sound output below that frequency range.

The exciter functions as a tweeter, and a separate woofer may be used with the exciter. The controller of the display device may allot mid and high frequency range audio signals from the crossover point to be reproduced by the exciter, and low frequency range audio signals below the crossover point to be reproduced by a separate woofer.

FIG. 6 shows a graph showing frequency characteristic curves of sound reproduced when an exciter is mounted to a resonating plate through an adhering member and a boss. Line 98' represents audio frequency characteristics reproduced by the front panel fixed to the exciter, and line 99' represents audio frequency characteristics reproduced by a woofer. The crossover between the exciter 110 and the woofer 105 may be between approximately 1 and 2 KHz. If an adhering member such as double-sided tape or glue is interposed between the front surface of the exciter 4 and the rear surface of the resonating plate 3 and the exciter 4 is fixed by a boss 34, the boss 34 may interfere with the generation of sound in a low frequency range. In comparison to a case where a boss is not used, there may be a need to broaden the range of low level frequencies capable of being generated. In other words, the sound reproduced by the exciter 110 may be set at 500 Hz or more.

Second Embodiment

FIG. 7 shows an exploded perspective view of a display device according to the second embodiment of the present disclosure. A display device 100 may include a front panel 101, a display module 102, a back cover damper pad 103, and a back cover 104. However, in the second embodiment, the exciter 110 may be installed directly on the front panel 101. In other words, the exciter 110 is not installed on a separate resonating plate, but is directly fastened to a rear surface of the front panel 101. Here, the fastening structure may be the same or similar as that disclosed in FIG. 4.

In the second embodiment, the front panel 101 also performs the function of the resonating plate, and, an improvement in the reproduction of lower range frequencies may be expected. Because the front panel 101 directly functions as the resonating plate, there may be no need to incorporate a separate resonating plate or a damper pad provided between the front panel and the resonating plate. In addition, if the frequency range of the exciter 110 is increased and set at a suitable level, there may be no need for the back cover damper pad 103 provided between the front panel 101 and the back cover 104.

A woofer 105 may be disposed on the rear surface at both sides of the display module 102, and may deliver low frequency sound through the rear surface of the display device. By installing the woofer in this manner, the overall surface area of the display device (when viewed from the front) can be reduced. If the woofer is installed on the front, the front panel may be enlarged in area by at least the size of the woofer.

Because the present embodiment does not use a structure to install a separate resonating plate, the structure may be simpler. The transfer of vibrations may be more direct, and the overall sound reproduction efficiency may be improved. Not only is there no need for components for installing the resonating plate, there may be no need for the added depth to install typical speaker systems, so that the width of the display device may be reduced. Even in instances where a resonating plate is used or not used, the height of the display device may be reduced depending on the size of the resonating plate and/or exciter.

FIG. 8 shows a schematic view of the driving circuit of a speaker system for a display device according to the second embodiment. A speaker system may include a tuner 501, a signal separator 502 that separates frequencies output from the tuner 501 into audio frequencies and video frequencies, a sound processor 503 that converts digital signals to analog signals with respect to the audio frequencies output from the signal separator 502 and performs sound processing of volume, treble, bass, etc. with respect to the converted sound signals, and an amplifier 504 that amplifies the sound signals applied from the sound processor 503. As can be appreciated, the driving circuits may be applicable to other embodiments.

A plurality of exciters 110 is attached to the rear surface of the front panel 101 that protects the display module 102. The audio signal that is amplified through the amplifier 504 induces the exciter 110 to vibrate. The sonic vibration generated by the exciter 110 is directly transferred to the rear surface of the front panel 101, so that the vibration of the front panel 101 outputs sound.

FIG. 9 shows a side view of a display device according to the second embodiment. The exciter 110 may be fastened directly to the rear surface at the lower portion of the front panel 101. From the lower portion of the back cover 104 that covers the rear surface of the display device, the portion covering the exciters 110 may be formed thinner than the remainder of the display device. Therefore, the lower portion of the back cover 104 forms a sloped surface 107 that can be made to rise steeply, so that a user may perceive the display device to be thinner.

In the present embodiment, while a description is given of the exciter 110 being fastened to the lower edge portion of the front panel 101, the configuration is not limited thereto. For example, the exciter may be attached in the same way to the upper edge portion of the front panel. Further, the exciter may be attached to each side of the front panel. Numerous variations for attachment is possible.

FIG. 10 shows an enlarged sectional view of section A in FIG. 9. The exciter 110 may be directly mounted to the rear surface of the front panel 101. The exciter 110 includes a yoke 111 forming the outer shape of the exciter 110, and magnets 112 and 113 are provided within the yoke 111 to form magnetic flux. A metallic plate 114 is inserted between the magnets 112 and 113, and a bobbin 118 is inserted outside the magnets 112 and 113 to vibrate in a back and forth direction (when viewed in FIG. 11).

A voice coil 115 wound around the outer circumference of the bobbin 118 and through which a current flows. A coupler 119 is coupled to the end of the bobbin 118, and a ring 116 is coupled at the unsealed surface of the yoke 111. A damper 117 with one side connected to the ring 116 and the other side connected to the bobbin 118 maintain the voice coil 115 in a central position.

The yoke 111 is recessed to a predetermined depth and performs the function of positioning the magnets 112 and 113, which are secured in the recessed portion. When a current flows through the voice coil 115, the bobbin 118 moves or vibrates back and forth direction according to Fleming's left-hand rule. In other words, from a state in which the direction of the magnetic flux is fixed by the magnets 112 and 113, each time the current flowing through the voice coil 115 rotates 180°, the bobbin 118 vibrates in a front-to-rear direction.

When applying this to Fleming's left-hand rule, the thumb represents the moving direction of the bobbin 118, the index finger represents the magnetic flux direction, and the middle finger represents the current flow direction. The magnetic flux direction may be fixed, and when the current flow direction shifts by 180°, the bobbin 118 vibrates back and forth. The damper 117 not only performs damping, but also retains the bobbin in a central position so that the voice coil 115 is able to function properly.

The method of installing the exciter 110 to the front panel 101 may employ coupling with the use of screws, as in the first embodiment in conjunction with a tab provided on the ring 116 and boss. The structure of the exciter (or transducer) may be substantially the same in the various embodiments of the present disclosure. An exciter described in International Patent Publication No. WO 97/09859 and U.S. Pat. No. 6,151,402, whose entire disclosure is incorporated herein by reference, may be used.

The coupler 119 covers the end of the bobbin 118, and has an annular shape with a predetermined thickness. The front surface for the coupler 119 is completely sealed against the rear surface of the front panel 101. Therefore, assembly of the voice coil 115 and the bobbin 118 vibrates within an audio frequency range. The yoke 111 is fixed to the rear surface of the front panel through screws, as shown in FIG. 4. When, the bobbin 118 vibrates, the vibrations may be directly transferred to the front panel 101, whereby the front panel 101 outputs sound by vibrating.

The bobbin 118 may directly coupled to the rear surface of the front panel 101 so that a high quality sound can be produced. Because the front panel 101 functions as a resonating plate, there may be no need to incorporate a suspension structure between a resonating plate and a support. The manufacturing process of the speaker system may be simplified.

Third Embodiment

FIG. 11 shows a frontal view of a display device according to the third embodiment of the present disclosure. A display device 200, a front panel 201, and a back cover are combined. An exciter 210 is fastened to the rear surface at the side edges of the front panel 201. Because the exciter 210 allows the front panel 201 to function inherently as a resonating plate, sound reproduction efficiency in the low frequency range may be improved. Manufacturing at the factory may be also made easier by the simpler fastening structure of the exciter, and the overall manufacturing process is simplified. Due to a lack of a separate resonating plate, the size of the display module 202 may remain unchanged while the overall dimensions of the display device 200 may be reduced. Further, the bottom 208 of the front panel 201 may be eliminated to further reduce the height.

FIG. 12 shows a plan view of a display device according to the third embodiment of the present disclosure. The exciter 210 may be fastened or attached to the rear surface at the side edges of the display device. Thickness at the side edges of the display device 200 may be further reduced, and portions of the back cover 203 corresponding to the locations of the exciters 210 may be formed further inward.

Both side ends of the back cover 203 may be gradually sloped inward to form side sloped surfaces 205, so that a user of the display device may perceive that the thickness at the sidewalls of the display device is gradually reduced, which may elevate product satisfaction. Because a user may likely view a display device more often from the side than from the bottom, a perception that the display device is thinner (from viewing it from the side) can be more prominent.

Fourth Embodiment

FIG. 13 shows an exploded perspective view of a display device according to the fourth embodiment of the present disclosure. The installation of the front panel 301, display module 302, damper pad 305, back cover 306, and exciter 303 are the same or similar as in the second embodiment. The woofer 304 is disposed on the bottom portion of the front panel that may be bent inward. The woofer 304 is installed on the bottom of the front panel facing downward, and audio bass frequencies may be transmitted through the floor. A user may be able to feel the bass. In addition, the woofer 304 is installed proximate to the exciter 303, so that a user may perceive that the sound is being emitted from the same location. Thus, the system can provide a more "live" listening experience.

Fifth Embodiment

FIG. 14 shows an exploded perspective view of a display device according to the fifth embodiment of the present disclosure. The front panel 401, display module 402, damper pad 405, exciter 403, and back cover 406 are the same or similar as in the fourth embodiment in terms of installation. The woofer 404 is installed on the bottom surface of the back cover 406, and not on the front panel 401. The same effects may be derived as in the fourth embodiment.

Sixth Embodiment

FIG. 15 shows an exploded perspective view of a display device according to the sixth embodiment of the present disclosure. In the sixth embodiment, while other aspects remain substantially the same or similar as in the fourth embodiment, the installed position of the exciter is different. A portion of a plurality of exciters 403 is installed on the rear surface at the top of the front panel 401, and the remaining portion is installed on the rear surface at the bottom of the front panel 401.

Seventh Embodiment

FIG. 16 shows a rear perspective view showing a portion of a display device according to the seventh embodiment of the present disclosure. While other aspects remain substantially the same or similar as in the fourth embodiment, the installed position of the exciter is different. The display module 602 is installed on the rear surface of the front panel 601, extending a predetermined thickness rearward at the sides. The sides of the front panel 601 have a plurality of exciters 603 installed thereon. The exciters 603 may be installed facing sideways with respect to the display device 600. The left surface and the right surface of the front panel 601 may have exciters 603 with different frequency ranges installed respectively thereon.

Instead of being installed on the sides of the front panel 601, the exciters 603 may be installed on the upper edge so that sound is directed upward from the display device. Instead of being installed on the front panel 601, the woofer 604 may be installed on the back cover, similar to the previous embodiments.

Eighth Embodiment

FIG. 17 shows a perspective view of a back cover of a display device according to the eighth embodiment of the present disclosure. The exciter 603 is characterized in that it is installed on the side of the back cover 606, in which case, the same effects of the sixth embodiment can be derived. The exciter 603 may not restricted to being installed on the sides of the back cover 606 as shown, but may be installed on the top/bottom of the back cover.

Ninth Embodiment

FIG. 18 shows a sectional view of FIG. 8 taken along line II-II'. A recessed portion (or a stepped portion 108) may be recessed a predetermined depth into the rear surface of the front panel 101 in the region where the exciter 110 may be installed. The thickness of the portion on which the exciter 110 may be installed is less than the thickness of other regions, so that the vibrations provided by the exciter 110 can oscillate the front panel 101 in a wider range of movement, shown in FIG. 6.

By making only the portion of the front panel 101 on which the exciter 110 is installed thinner, the strength of the front panel 101 can be retained, so that the separate reinforcements may not be needed. The same or similar profile of FIG. 18 for the front panel 101 may be also used for the resonance plate. Such similar profiles may be used for above other embodiments.

The front panel having the portions on which the exciters 110 are installed may be varied in overall thickness such that the thickness gradually decreases front the ends toward the middle.

Tenth Embodiment

FIG. 19 shows an exploded perspective view for describing when the exciter is fastened to the resonating plate. The resonating plate 3 increases in thickness further outward from where the exciter 4 is fastened. Thus, the thickness t1 at the region where the boss 34 is installed is less than the thickness t2. Accordingly, the vibrations generated by the exciter 4 are able to vibrate the resonating plate 3 at a greater oscillation amplitude. A reinforcing portion 35 for reinforcing the strength of the thinner portion of the resonating plate 3 may be added. In order that such a reinforcement 35 does not prevent the reduction of the resonating plate's 3 sonic vibration, the reinforcement 35 may be formed in the same direction as the direction in which the resonating plate 3 extends.

A larger resonating plate 3 may provide better sound production. The resonating plate also serves as part of the front panel 2 to protect the display module. By increasing the size of the resonating plate, the overall size of the display device is increased. There should be a balance between size of the resonating plate and sound quality produced by the resonating plate.

According to the present disclosure, the rear surface of the resonating plate may be curved to increase the surface area thereof, thereby preventing loss of sound while allowing the exciter to function as a speaker system of the display system without increasing the size of the resonating plate 3.

One resonating plate may be provided at the bottom along the length of the display to reproduce stereo sound. However, embodiments are not limited thereto, and one resonating plate may alternately be provided on the left and right sides of the front panel, respectively. Also, in the above embodiment, the resonating plate is described as being disposed at the lower portion of the front panel; however, it may be alternately disposed at the upper portion of the front panel.

Eleventh Embodiment

FIG. 20 shows an exploded perspective view of a display device according to the eleventh embodiment of the present disclosure. FIG. 21 shows a cutaway sectional view taken along line III-III' in FIG. 20, and FIG. 22 shows a cutaway sectional view taken along line IV-IV' in FIG. 20. Referring to FIGS. 20 to 22, a display device 1 according to the eleventh embodiment is substantially the same in terms of structure as the first embodiment, with the difference lying in the structure of the resonating plate 3 mounted on the front panel 2.

A mounting portion 21 for mounting the resonating plate 3 to the lower end of the front panel 2 is recessed a predetermined depth. The mounting portion 21, unlike the mounting portion 9 shown in FIG. 2, is a structure with a closed mounting surface. An exciter hole 22 is formed in the mounting portion 21 to pass the exciter 4 through. A boss 34 for fixing the exciter 4 extends from the rear surface of the resonating plate 3.

The resonating plate 3 is firmly mounted by means of a bonding member (B) to the mounting portion 21. The type of bonding member (B) used may be a liquid adhesive, double-sided tape, etc. A separate damper pad may not be interposed, and the firm bonding provided by the bonding member (B) is sufficient to prevent an excessive amount of noise generated by friction between the resonating plate 3 and the mounting portion 21. The exciter 4 mounted to the rear surface of the resonating plate 3 may be provided singularly or in plurality at each side of the mounting portion.

FIG. 23 shows a frontal view showing the installed positions of an exciter based on dimensions of various display devices, models A-C, having different dimensions.

Table 1 sets forth locations at which the optimal sound quality can be reproduced with exciters provided at either side of the display panel of FIG. 23.

TABLE 1

|  | model A | model B | model C |
| --- | --- | --- | --- |
| a(mm) | 111 | 116.8 | 112.8 |
| b(mm) | 46 | 54 | 61 |
| exciter position | X | X | Y |

Referring to Table 1 and FIG. 23, the exciter 4 is mounted at the lower portion of the front panel 2 or the resonance plate, with the mounting location of the exciter 4 being determined based on the dimensions of the display module, e.g., the height (a) of the lower end of the display module 6 and height (b) of the lower end of the front panel 2 of the resonating plate 3.

As shown in Table 1, the exciter 4 may be mounted on the rear surface of the resonating plate 3 or the top rear surface of the resonating plate 3, based on the height (b) of the resonating plate 3 and the overall height (a) of the lower end of the front panel 2. In other words, the exciter 4 may be mounted in a resonating plate region (R2) or an upper region (R1) above the resonating plate region (R2), based on the heights (a and b).

Mounting positions for the exciter 4 have been determined according to dimensions of the display module 6; however, the exciter 4 should be located at a region (c) within 100 mm from the edge of the front panel 2. If the exciter 4 is mounted approximately 60 mm from the edge of the front panel 2, optimum stereo sound characteristics may be realized. However, the mounting location of the exciter 4 is not limited to positioning according to the above data, and the mounting position of the exciter 4 on the rear surface of the front panel 2 falls within the overall scope of the present disclosure.

The present disclosure provides a display device and a speaker system for the display device with a structure in which an exciter can be directly attached at a suitable location on the display device, which may reduce the manufacturing cost of the display device.

A display device having a speaker system may use the entire front panel of the display device to function as a resonating plate to reproduce sound in a wider frequency range.

A display device and a speaker system may satisfy a consumer's desire for reduced thickness and/or dimension of the display device and may be more aesthetic.

A device including in one embodiment may include: a front panel; an exciter mounted to the front panel; a back cover coupled to the front panel; and a display module provided between the front panel and the back cover.

A display device in one embodiment may include: an exciter vibrating through a current applied thereto; a resonating plate having the exciter directly mounted to a rear surface thereof; a front panel having the resonating plate pressed against a side thereof; a back cover coupled at a rear of the front panel; a display module protected by the front panel and the back cover, to output an image; and a woofer provided on at least one of the rear surface of the front panel and an inner surface of the back cover.

A display device in another embodiment may comprises: a housing having a front part, a back part and edge parts, the front part including top, side and bottom surfaces to define an opening, a width of a front dimension of the housing being greater than a width of the side dimension of the housing; a flat panel display module, the flat panel display module being provided within the housing such that a display area of the flat panel display module is provided within the opening of the housing; and at least one exciter provided on the housing, the exciter having a thickness which is smaller than width of the side dimension of the housing, a width of the exciter being smaller than the height of at least the top surface or bottom surface of the front part or the width of the exciter being smaller than a width of the side surface of the front part, wherein the housing is formed such that a thickness of region where the exciter is mounted is different from the thickness of the remaining region.

A speaker system for a display device of another embodiment may include: a front panel; an exciter including a bobbin provided on a rear surface of the front panel, a voice coil wound around the bobbin, a magnet provided within the bobbin, and a yoke supporting the magnet; a back cover coupled to the front panel; and a display module received between the front panel and the back cover.

The display device and the speaker system according to various embodiments of the present disclosure may reduce the manufacturing cost. A wider audio frequency range can be reproduced by the exciter because the front panel may function as a resonating plate. The thickness of the display device may be reduced, which may increase the level of consumer satisfaction. The tweeters that reproduce higher frequencies and woofers that reproduce lower frequencies can be positioned together, sound reproduction may be more realistic.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A display device, comprising:
a housing having a front part, a back part, and a plurality of edge parts, the front part of the housing including top, side, and bottom surfaces that define an opening, wherein a width of a front dimension of the housing is greater than a width of a side dimension of the housing;
a flat panel display module provided within the housing such that a display area of the flat panel display module is provided within the opening of the housing; and
at least one exciter provided on the front part or the plurality of edge parts of the housing, the at least one exciter having a thickness which is smaller than the width of the side dimension of the housing, a width of the at least one exciter being smaller than a height of at least one of the top surface or the bottom surface of the front part of the housing or the width of the at least one exciter being smaller than a width of the side surface of the front part of the housing, wherein the housing is formed such that a thickness of a region of the front part or the plurality of edge parts to which the at least one exciter is mounted is thinner than a thickness of remaining regions of the front part or the plurality of edge parts.

2. The display device of claim 1, wherein the at least one exciter is directly mounted to the housing.

3. The display device of claim 1, wherein an inner surface of the housing where the at least one exciter is mounted becomes progressively thinner from an edge toward a center of the housing.

4. The display device of claim 1, wherein the region where the at least one exciter is mounted is recessed a predetermined depth or is stepped.

5. The display device of claim 1, wherein the at least one exciter comprises a plurality of exciters, and the plurality of exciters are arranged with a predetermined distance therebetween.

6. The display device of claim 1, further comprising a sub-woofer mounted on an inner circumferential surface of the housing.

7. The display device of claim 1, wherein the plurality of edge parts includes top, bottom, and side surfaces, and the at least one exciter is attached to one of the top, bottom and side surfaces of the plurality of the edge parts.

8. The display device of claim 1, wherein the housing further includes a plate at a bottom end thereof and forming a portion of the front part of the housing, and wherein the at least one exciter is attached to a rear surface of the plate.

9. The display device of claim 8, wherein the at least one exciter comprises at least two exciters, and each of the at least two exciters is provided nearer to opposing end parts of the plate.

10. The display device of claim 8, wherein a front surface of the plate is flush with a front surface of the bottom end of the housing.

11. The display device of claim 1, wherein the housing further includes a plate forming a portion of the front part of the housing, and wherein the at least one exciter is attached to a rear surface of the plate.

12. The display device of claim 11, wherein an inner surface of the plate where the at least one exciter is mounted becomes progressively thinner from an edge toward a center of the plate.

13. The display device of claim 12, wherein the plate includes at least one reinforcing portion that reinforces a strength of the thinner portion of the plate.

14. The display device of claim 13, wherein the at least one reinforcing portion extends in a direction in which the plate extends.

15. The display device of claim 13, wherein the plate and the at least one reinforcing portion are integrally formed.

16. The display device of claim 11, wherein the plate is attached to a top end of the housing or side ends of the housing.

* * * * *